United States Patent [19]

Nagano

[11] Patent Number: 4,528,865
[45] Date of Patent: Jul. 16, 1985

[54] HANDLE FOR A BICYCLE

[75] Inventor: Masashi Nagano, Izumi, Japan

[73] Assignee: Shimano Industrial Company Limited, Osaka, Japan

[21] Appl. No.: 404,148

[22] Filed: Aug. 2, 1982

[30] Foreign Application Priority Data

| Aug. 18, 1981 | [JP] | Japan | 56-122788[U] |
| Mar. 18, 1982 | [JP] | Japan | 57-39015[U] |
| Mar. 18, 1982 | [JP] | Japan | 57-39019[U] |
| Jun. 11, 1982 | [JP] | Japan | 57-87744[U] |

[51] Int. Cl.³ .......................................... B62K 21/16
[52] U.S. Cl. ................................ 74/551.4; 403/374; 403/205
[58] Field of Search ............. 74/551.3, 551.4, 551.1, 74/551.5; 403/374, 205, 409, 169, 170; 280/279

[56] References Cited

U.S. PATENT DOCUMENTS

| 580,443 | 4/1897 | York | 74/551.4 |
| 2,180,617 | 11/1939 | Snell | |
| 3,388,612 | 6/1968 | Oakley et al. | 74/551.4 |
| 4,245,522 | 1/1981 | Robinson | |

FOREIGN PATENT DOCUMENTS

| 619800 | 4/1927 | France | |
| 677744 | 3/1930 | France | |
| 442982 | 12/1948 | Italy | 74/551.3 |
| 313362 | 6/1929 | United Kingdom | |
| 578359 | 6/1946 | United Kingdom | 74/551.3 |
| 587945 | 5/1947 | United Kingdom | |
| 1138463 | 1/1969 | United Kingdom | |

Primary Examiner—Kenneth J. Dorner
Attorney, Agent, or Firm—Stevens, Davis, Miller & Mosher

[57] ABSTRACT

A handle for a bicycle comprising a handle stem and a pair of left-hand and right-hand handle bars, the handle stem being provided at the upper portion with a bar holding member which is directed lengthwise of the handle stem and has bar fitting portions into which the left-hand and right-hand handle bars are fitted in relation of being rotationally adjustable, the bar fitting portions being slanted at the upper portions thereof away from the center line lengthwise of the handle stem, the left-hand and right-hand handle bars being fixed to the handle stem in a relation permitting a distance between grips at the handle bars, a height of each grip, and a position thereof longitudinal of the bicycle, to be adjustable.

11 Claims, 16 Drawing Figures

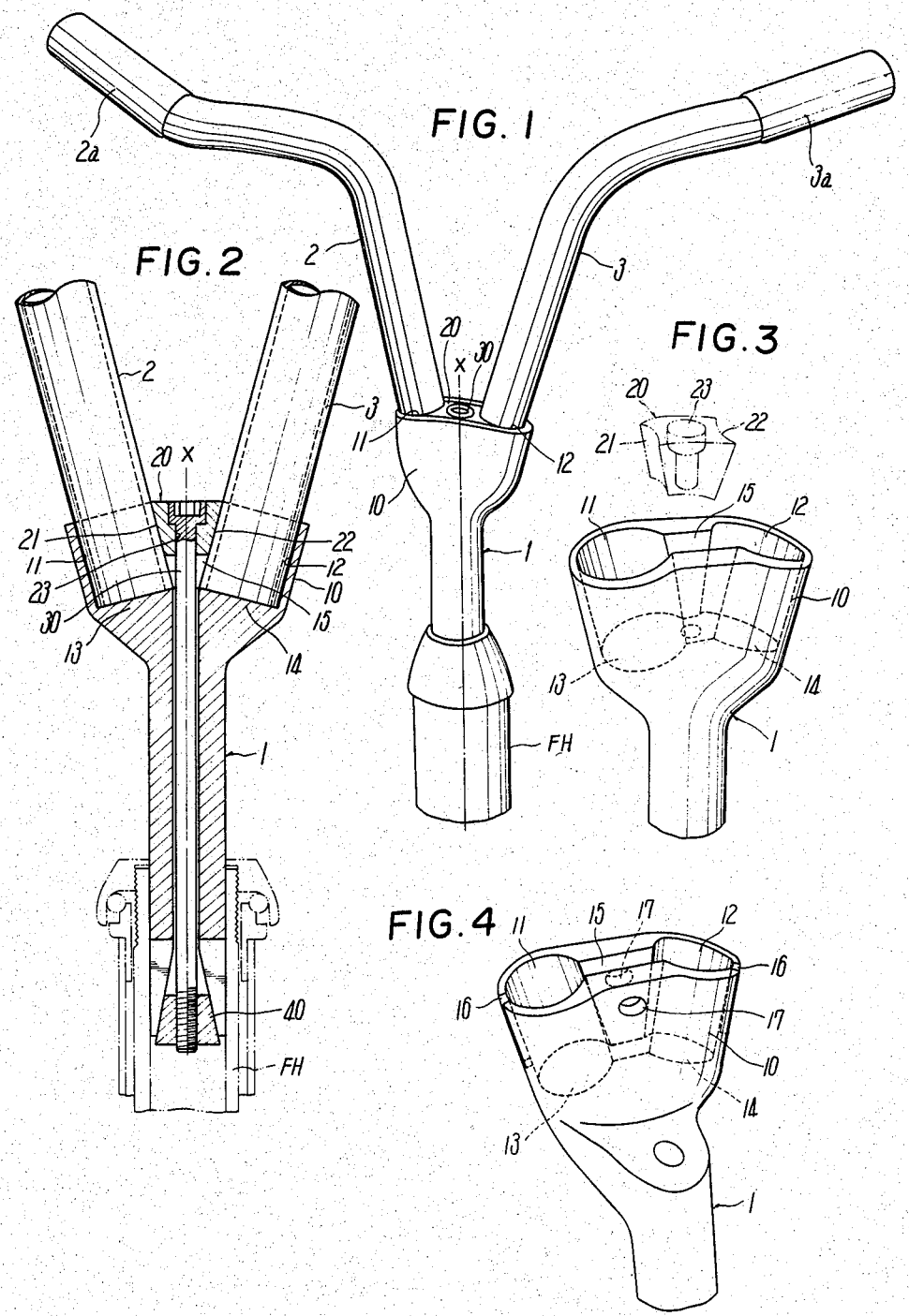

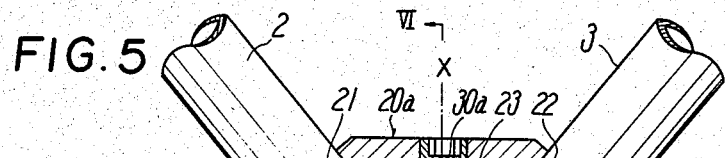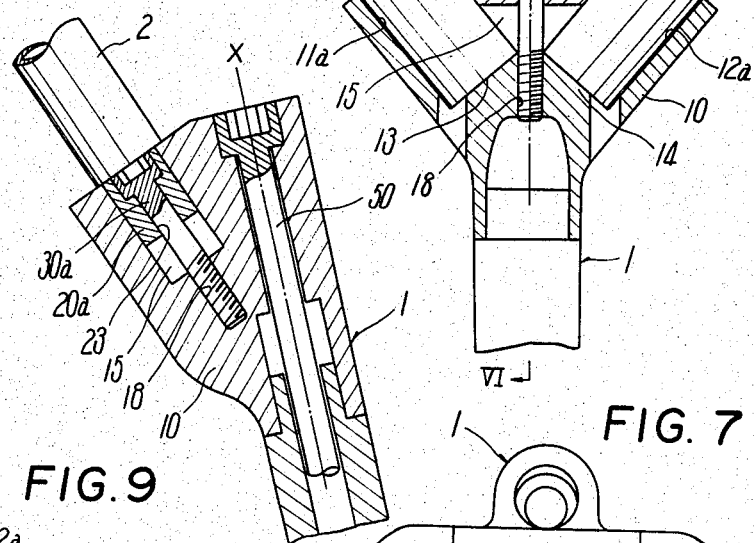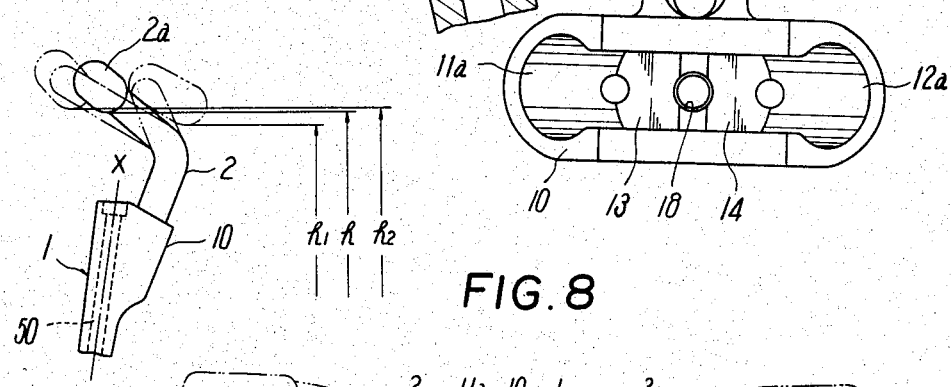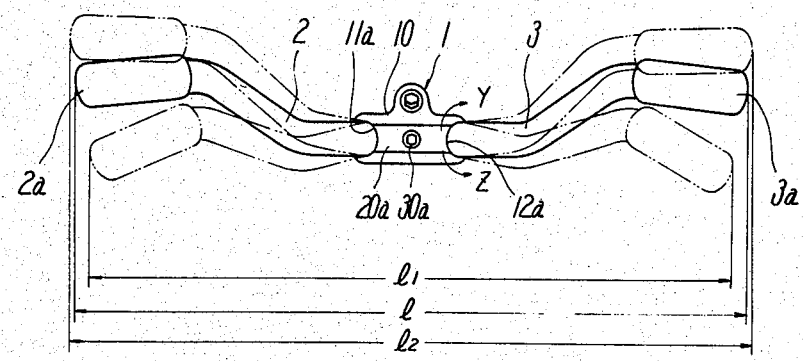

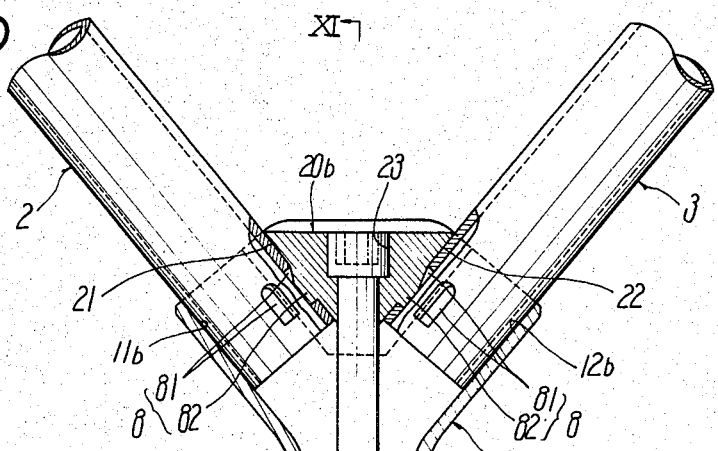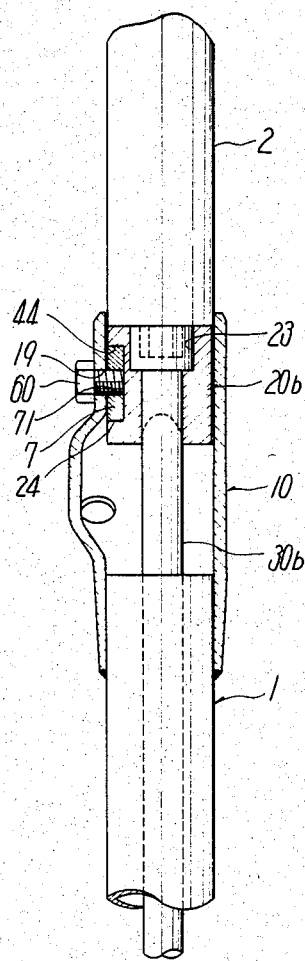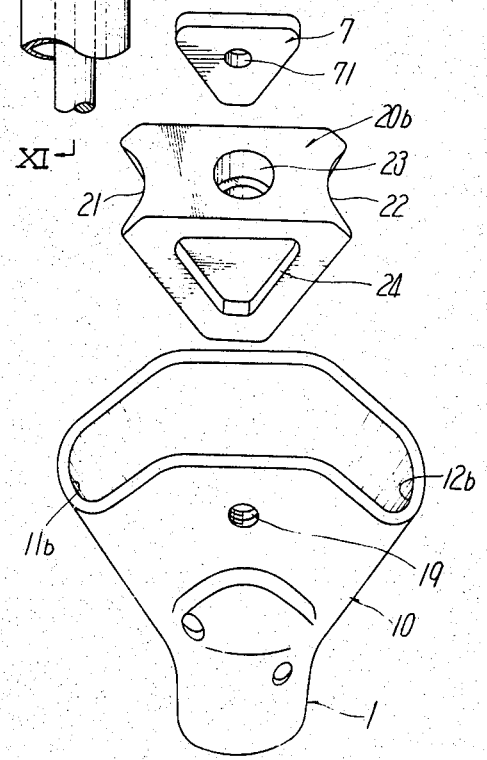

FIG. 13
FIG. 14
FIG. 15
FIG. 16
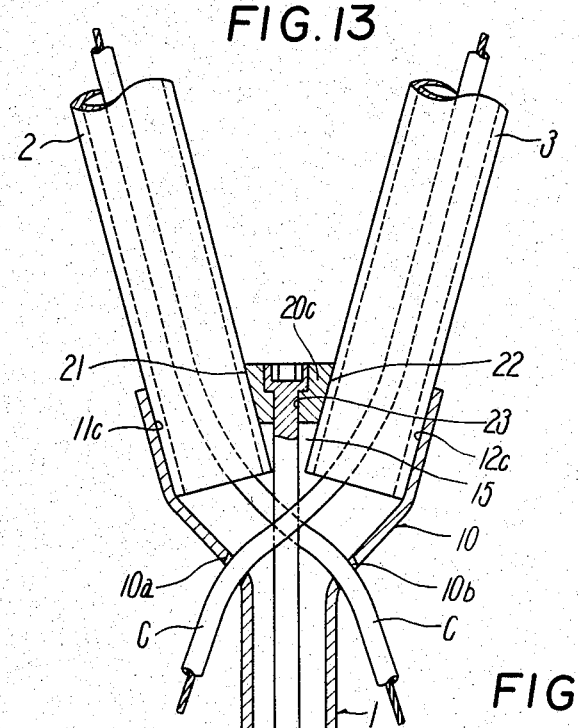
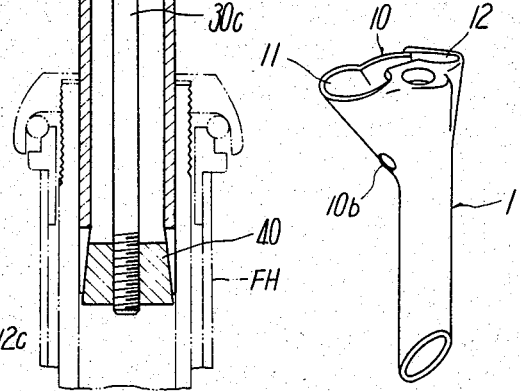
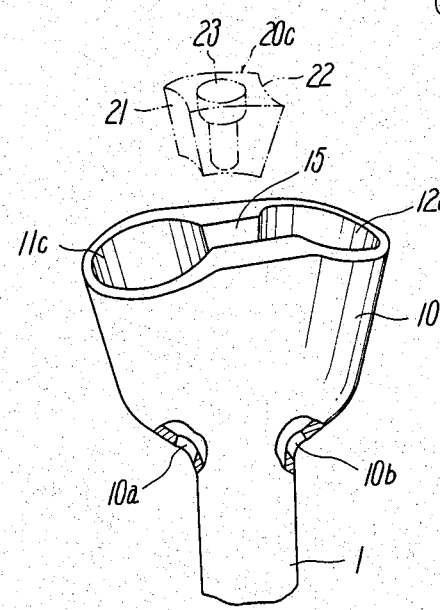
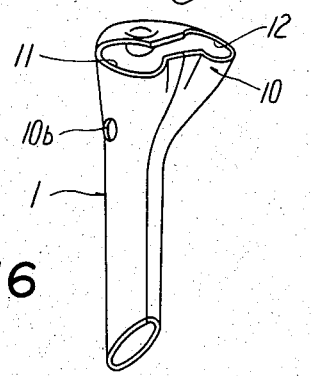

HANDLE FOR A BICYCLE

FIELD OF THE INVENTION

This invention relates to a handle for a bicycle, and more particularly to a handle for a bicycle, which comprises a handle stem mounted on a front fork and a pair of left-hand and right-hand handle bars mounted on the handle stem.

BACKGROUND OF THE INVENTION

Conventionally, a handle for a bicycle is with one handle bar inserted horizontally through a tubular bar-holding portion extending horizontally from a projecting portion provided at an upper portion of the handle stem and extending radially outwardly therefrom. The handle bar is fixed to the bar holding portion by use of a tightening bolt. Therefore, a load when a cyclist drives the bicycle, is imposed from the handle to the bar holding portion in the direction of being tightened, so that the handle bar must be fixed rigidly by the tightening bolt. As a result, mounting or dismounting of the handle bar is not easy. When the handle bar is not rigidly fixed due to insufficient tightening or looseness of the tightening bolt, the handle bar is subjected to a rotational load and carelessly rotates to shift the handle grips downwardly so that the cyclist may fall down.

In addition, the handle for the bicycle constructed as discussed above, which uses one handle bar, cannot adjust a distance between the grips provided at both ends of the handle bar, unless it is replaced by another handle bar of different size. Also, since the bar holding portion and the handle bar fixed thereto are fixed with respect to the handle stem, when the grips are changed in height, the handle stem must be adjusted vertically with respect to the front fork supporting the stem, thereby requiring much labor for the adjustment.

SUMMARY OF THE INVENTION

An object of the invention is to provide a handle for a bicycle, employing a pair of left-hand and right-hand handle bars, which are supported to the upper portion of the handle stem in the working direction of the load acting on the handle bars and which will not carelessly rotate during use even if not fixed as strongly as conventional, thereby preventing the handle grips from being shifted downwardly, and which, when fixed to the handle stem can adjust the grips to a proper distance between them and in a proper position vertically and longitudinally of the bicycle.

This invention is characterized in that the handle bar is divided into left-hand and right-hand handle bars and at the upper portion of the handle stem is provided a bar holding member which extends lengthwise of the handle stem and which has bar fitting portions. Two construction features are employed in the invention. One is that the left-hand and right-hand handle bars are inserted at one ends thereof into the bar fitting portions in relation of being rotationally adjustable and fixed to the bar holding member by use of fixing means respectively, and the other is that the bar fitting portions are slanted at the upper portions thereof away from the center line extending lengthwise of the handle stem so that the handle bars can be rotationally adjusted to adjust the distance between the grips and positions thereof vertically and longitudinally of the bicycle.

The left-hand and right-hand handle bars are inserted at the lower ends downwardly into the bar fitting portions at the bar holding member, respectively, and the load imposed on each handle bar is borne directly by the bar holding member. In other words, the fixing means for the handle bars are not subjected to the load so that, even if the handle bars are not rigidly fixed to the bar holding member by the fixing means, they will not be carelessly rotated or the grips shifted by the load on the handle bar and each grip, thereby preventing the cyclist will not be in danger of falling.

Furthermore, the handle bars, can be rotatably adjusted with respect to the bar fitting portions so as to adjust the distance between the grips and the grip positions vertically and longitudinally of the bicycle.

These and other objects of the invention will become more apparent in the detailed description and examples which follow.

BRIEF DESCRIPTION OF THE DRAWINGS

FIG. 1 is a perspective view of an embodiment of a handle for a bicycle according to the invention, which is fixed to a front fork of the bicycle, FIG. 2 is a partially enlarged longitudinally sectional view of the FIG. 1 embodiment, FIG. 3 is a perspective view of only the upper portion of a handle stem, FIG. 4 is a perspective view of a modified example of the upper portion of the handle stem in FIG. 3, FIG. 5 is a longitudinally sectional view of a modified embodiment of the invention, corresponding to FIG. 2, FIG. 6 is a sectional view taken on the line VI—VI in FIG. 5, FIG. 7 is a plan view of only the handle stem in the FIG. 5 embodiment, FIGS. 8 and 9 are views explanatory of adjustment of a distance between grips at the free ends of left-hand and right-hand handle bars and positions of the grips vertical and longitudinal of the bicycle, FIG. 10 is a longitudinally sectional view of another modified embodiment of the invention, corresponding to FIGS. 2 and 5 respectively, FIG. 11 is a sectional view taken on the line XI—XI in FIG. 10, FIG. 12 is a perspective exploded view of the principal portion of the FIG. 10 embodiment, FIG. 13 is a longitudinally sectional view of still another modified embodiment of the invention, corresponding to FIGS. 2, 5 and 10, FIG. 14 is a perspective view of the upper portion of a handle stem in the FIG. 13 embodiment, and FIGS. 15 and 16 are perspective views of modified examples of the handle stem.

DETAILED DESCRIPTION OF THE INVENTION

The handle of the invention, as shown in FIG. 1, comprises a handle stem 1 fixed to the upper portion of a front fork FH of the bicycle and a pair of seperate left-hand and right-hand handle bars 2 and 3. The handle stem 1, as shown in FIGS. 2 and 3, is provided integrally with a bar holding member 10 which extends lengthwise of handle stem 1 and has bar fitting bores 11 and 12 which open upwardly.

The bar fitting bores 11 and 12 each have a round inner periphery so that the left-hand and right-hand handle bars 2 and 3 are insertable rotatably into the bar fitting bores 11 and 12 respectively, and are disposed at both sides widthwise of the bicycle with respect to the lengthwise center line X of stem 1 and slanted outwardly widthwise of the bicycle so that the upper openings of bar fitting bores 11 and 12 are directed away from the center line X respectively.

The bar fitting bores 11 and 12 also are blind and have bottoms serving as receiving portions 13 and 14 which project from the inner periphery of the bores 11 and 12 and receive the lower ends of left-hand and right-hand handle bars 2 and 3 inserted into the bar fitting bores 11 and 12.

The handle bars 2 and 3 are inserted at the lower ends downwardly into the bar fitting bores 11 and 12 and are rotationally adjusted to set the grips 2a and 3a in proper positions for the cyclist, and are then fixed to the handle stem 1 by fixing means respectively.

The fixing means, for example, as shown in FIG. 2, comprises a cone 20 of an inverted frustum-like shape and a tightening bolt 30, the cone 20 having slant faces 21 and 22 in contact with the left-hand and right-hand handle bars 2 and 3 inserted into the bar fitting bores 11 and 12 respectively, and a vertical through-bore 23 with a stepped portion. The cone 20 is interposed into a groove 15 connecting the bar fitting bores 11 and 12 and allowing them to communicate with each other, and then the tightening bolt 30 is inserted through the cone 20 and screws forward to move the cone 20 downwardly, whereby the handle bars 2 and 3 inserted into the bar fitting bores 11 and 12 are pressed into contact with the inner peripheries and receiving portions 13 and 14 of the bores 11 and 12 respectively. The tightening bolt 30 uses a draw-up bolt, for example an expander bolt, which is inserted into the stem 1 to screw with a draw-up cone 40, for example, and expander cone, encased within the lower portion of stem 1. Alternatively, the bolt 30 may be separate from the draw-up bolt, but the use of the draw-up bolt eliminates use of a separate tightening bolt which reduces the number of parts, thus simplifying handle construction, improving its workability, and giving it a good appearance. When a separate tightening bolt 30 is used, the cone 20 need only be shifted radially outwardly with respect to the lengthwise center line X of stem 1 and a threaded bore for the bolt 30 be provided at the stem 1, or the bar fitting bores 11 and 12 need only be formed at a portion shifted radially outwardly with respect to the center line X and a threaded bore for the bolt 30 be formed at the stem 1. A width of the communicating groove 15 may be smaller than a diameter of each bar fitting bore 11 or 12 as shown in FIG. 3, or may be equal to the diameter. In addition, the communicating groove 15 is not indispensable when the cone 20 has, for example, an inverted-U-like-shaped to enter the bar fitting bores 11 and 12.

Another fixing means, shown in FIG. 4 is so constructed that the bar holding member 10 is provided at both lengthwise sides corresponding to the bar fitting bores 11 and 12 with one or more (two in the drawing) slits 16, the portions divided therewith and opposite to each other are made elastically shiftable, and horizontal through-bores 17 are provided on the opposite walls at the divided portions. A tightening bolt (not shown) is inserted through the bores 17 and tightened to elastically shift the divided portions so that the bar fitting bores 11 and 12 are contracted in diameter to fix therein the left-hand and right-hand handle bars. In this case, it is preferable to shift the bar holding member 10 or the tightening bolt with respect to the center line X of handle stem 1 as shown in FIG. 4.

Still another fixing means provides a bar holding member 10 separate from the handle stem 1, which member 10 is formed of an elastically shiftable material, such as synthetic resin, and fixed to the upper portion of handle stem 1 and has horizontal through-bores, so that a tightening bolt is inserted therethrough and tightened to elastically contract the bar fitting bores 11 and 12 in diameter as the same in FIG. 4, thus fixing the handle bars 2 and 3 into the bores 11 and 12.

In addition, the receiving portions 13 and 14 at the handle stem 1 are large enough to close the lower end face of the respective bar fitting bores 11 and 12, but such closing is not indispensable the receiving portions 13 and 14 need only be constructed to bear the handle bars 2 and 3 respectively.

In the just described construction, the left-hand and right-hand handle bars 2 and 3 are inserted at lower ends thereof into the bar fitting bores 11 and 12 and received by the receiving portions 13 and 14, the cone 20 is inserted into the communicating groove 15 between the bar fitting bores 11 and 12 and contacts at the slanted faces 21 and 22 with the outer surfaces of handle bars 2 and 3 respectively, and the tightening bolt 30 of the draw-up bolt is inserted into the handle stem 1 and screws with the draw-up cone 40 within the lower portion of handle stem 1, the cone 20 moving downwardly as the tightening bolt 30 is screwably tightened, whereby the handle bars 2 and 3 are press-contacted with the inner peripheries of bar fitting bores 11 and 12 and fixed thereto. Incidentally, the lower portion of handle stem 1, prior to tightening the tightening bolt 30, is inserted into the front fork FH, and then the bolt 30 is tightened to fix the stem 1 to the front fork FH.

Alternatively, the bar fitting bores 11 and 12, as shown in FIGS. 5 and 6, may be slanted longitudinally backwardly of the bicycle as well as widthwise outwardly thereof, in which a cone 20a constructed the same as in FIG. 2 is used as the fixing means for the handle bars 2 and 3 and a screw member 30a therefor is separate from the draw-up bolt 50 for the handle stem 1, a threaded bore 18 being formed thereat and screwable with the screw member 30a.

Other components in FIGS. 5 and 6 are the same as those in FIG. 2, and are designated by the same reference numerals.

Also, in FIGS. 5 and 6, the bar fitting bores 11a and 12a each are slanted at an angle of about 40° at both lateral sides with respect to the center line X of the handle stem 1 (widthwise outwardly of the bicycle) and at an angle of about 15° to 25° longitudinally backwardly of the bicycle with respect to the center line X, regardless of the permanent inclination of the stem 1.

The reason for the above is so the left-hand and right-hand handle bars 2 and 3 fitted into the bar fitting bores 11a and 12a can be rotated so that the grips at the handle bars 2 and 3 are made adjustable in position respectively, as follows:

In the construction shown in FIGS. 5 and 6, the bar fitting bores 11a and 12a each are made slanted laterally outwardly and upwardly with respect to the center line X and longitudinally backwardly of the bicycle with respect to the axis of stem 1 regardless of its permanent inclination.

Therefore, the tightening bolt 30a can be loosened and the respective handle bars 2 and 3 rotated in the direction of the arrow Y in FIG. 8 from the position shown by the solid line in FIGS. 8 and 9 so that a distance $l_1$ between the grip 2a and 3a ends at the handle bars 2 and 3, is made smaller than a distance l between the grip ends shown by the solid line and a height $h_1$ of each grip end to the ground is smaller than that h of each grip end shown by the solid line. Hence, the grips 2a and 3a shift longitudinally backwardly of the bicycle, in other words, toward the cyclist on the bicycle, whereby, if the cyclist is an infant, he can steer the bicycle with ease.

Meanwhile, when the respective handle bars 2 and 3 are rotated in the direction of the arrow Z in FIG. 8 from the position shown by the solid line in FIGS. 8 and 9, a distance $l_2$ between the grip 2a and 3a ends, becomes larger than that l and a height $h_2$ of each grip end is larger than that h to the ground, whereby the grips 2a and 3a move longitudinally frontward of the bicycle, in other words, away from the cyclist. Hence, if the cyclist is an adult, he can steer the bicycle with similar ease.

Alternatively, the bar fitting bores 11, 12, 11a and 12a in the former embodiments may be replaced by projections insertable into the end of each handle bar 2 or 3 respectively.

Also, the receiving poritons 13 and 14 at the bar fitting bores 11, 12, 11a and 12a may be omitted as shown in FIG. 10, in which case a cone 20b is used as the fixing means and the draw-up bolt is utilized as a screw member 30b for fixing the handle bars 2 and 3 into the bar fitting bores 11b and 12b.

In this case, at least one of the bar holding member 10 and cone 20b, is provided with a holding means which temporarily prohibits the cone 20b from moving in the direction of being tightened and holds it in the vicinity of the openings of bar fitting bores 11b and 12b.

The holding means, for example as shown in FIGS. 11 and 12, provides a horizontal through-bore 19 at one side of bar holding member 10 and a holding bore 24 at one side of cone 20b, so that a stopper 7 formed of an elastically deformable material, such as rubber, and having a bore 71 through which a set screw 60 screwable with the through bore 19 is inserted, is held within the holding bore 24. The set screw 60 screwed with the threaded bore 19 is inserted into the bore 71 at the stopper 7 and temporarily prohibits the cone 20b from moving in the direction of being tightened, and then the screw member 30b screwably tightens the cone 20b through the elastical deformation of stopper 7.

Alternatively, the holding means for the cone 20b, may provide at least one projection projecting inwardly from the inner surface of bar holding member 10, and, at the lateral side of cone 20b, a stopper held thereto and comprising a rubber plate or a leaf spring, the stopper being elastically deformed by the projection to thereby hold the cone 20b. Also, the cone 20b may provide a stopper formed of rubber or a spring and projecting from the outer surface of the cone 20b, the stopper being elastically deformed in contact with the inner surface of bar holding member 10 to thereby hold the cone 20b, or the bar holding member 10 may provide, for example, a pair of slits extending downwardly from the openings at the bar fitting bores 11b and 12b, so that the portions of the bar holding member 10 between the slits are adapted to project inwardly of the bar fitting bores 11b and 12b and are elastically deformed by the cone 20b, thereby holding the cone 20b by use of an elastically restoring force of each projecting portion. Thus, the holding means is not particularly defined.

In addition, in FIG. 10, reference numeral 8 designates a positioning mechanism which sets each handle bar 2 or 3 in rotational position and comprises a plurality of first engaging portions 81 provided at each handle bar 2 or 3 at regular intervals in the direction of rotation of each handle bar 2 or 3 and second engaging portions 82 provided at the cone 20b are each engageable with one of first engaging portions 81 at each handle bar 2 or 3. The first engaging portions 81 in FIG. 10 comprise through bores provided at the end portions of handle bars 2 and 3 inserted into the bar fitting bores 11b and 12b, the second engaging portions 82 comprising projections provided at the slant faces 21 and 22 of cone 20b.

In the last described construction, the left-hand and right-hand handle bars 2 and 3 are fixed to the handle stem 1 in such a manner that the cone 20b holding the elastic stopper 7 is at first inserted into the bar fitting bores 11b and 12b at the bar holding member 10, the tip of set screw 60 screwing with the threaded bore 19 at the bar holding member 10 is inserted into the through bore 71 at the elastic stopper 7 to thereby hold the cone 20b in the vicinity of the openings at the bar fitting bores 11 and 12, and then the left-hand and right-hand handle bars 2 and 3 are fitted into the bar fitting bores 11b and 12b, moving along the slanted inner surfaces thereof, at which time the cone 20b held at the above position can reliably restain the handle bars 2 and 3 from moving by their weight within the bores 11b and 12b and temporarily stop the handle bars 2 and 3. Thereafter, a screw member 30b is inserted into the handle stem 1 through the stepped bore 23 at the cone 20b and screws with a draw-up cone (not shown) inserted into the lower portion of the stem 1. The cone 20b moves in the direction of being tightened as the screw member 30b screws forward, thereby deforming the stopper 7 to press-contact the handle bars 2 and 3 against the slanted inner surfaces of bar fitting bores 11b and 12b.

Also, when the positioning mechanism 8 is provided as shown in FIG. 10, the left-hand and right-hand handle bars 2 and 3 are inserted one by one into the bar fitting bores 11b and 12b.

As seen from the above, the holding means provided at at least one of the bar holding member 10 and cone 20b, can easily temporarily restrain the left-hand and right-hand handle bars 2 and 3 in the vicinity of the openings of the bar fitting bores 11 and 12, and thereafter they are merely moved to be tightened, thereby fixing the handle bars 2 and 3 with ease.

The handle bars 2 and 3 are provided near the grips 2a and 3a with control levers for operating actuators, such as brakes, for the bicycle, the levers and actuators being connected with control cables. The control cables, when inserted within the handle bars 2 and 3, are not exposed to the exterior, are subjected to less air resistance, provided a good appearance, and avoid the danger of being hit by an external foreign object.

The bar holding member 10 of the invention provides through-bores 10a and 10b as shown in FIGS. 13 and 14, so that the cables C can easily be drawn out from the through bores 10a and 10b respectively.

Furthermore, the handle stem 1 is made from a light alloy and molded by die casting. Alternatively, a metalic pipe, as shown in FIG. 15, may be plastic-processed at its opening end to integrally form a bar holding member 10 having the bar fitting bores 11 and 12, or a metallic plate, as shown in FIG. 16, may be plastic-processed to be bent to integrally form the bar holding member 10.

Although several embodiments have been described, they are merely exemplary of the invention and not to be constructed as limiting, the invention being defined solely by the appended claims.

What is claimed is:

1. A handle for a bicycle, comprising a handle stem and a pair of left-hand and right-hand handle bars, each having a reversed substantially L-shape comprising a portion which is substantially vertical and a portion which is substantially horizontal when said bicycle is in a substantially upright position, the horizontal portions for receiving hand grips at free ends thereof, said handle stem including an upper portion having a bar holding member which extends lengthwise of said handle stem and has bar fitting portions into which said substantially vertical portions of said left-hand and right-hand handle bars are rotationally adjustably fitted, said bar fitting portions including upper portions in which said substantially vertical portions of said left-hand and right-hand handle bars are fitted, said upper portions being substantially disposed in a plane slanted at an angle relative to a center line extending lengthwise of said handle stem longitudinally backwardly relative to a forward movement direction of said bicycle, said upper portions being further slanted laterally at an angle relative to said center line of said handle stem, said bar holding member having a fixing means by which said left-hand and right-hand handle bars fitted into said bar fitting portions are fixed at positions to which said left-hand and right-hand handle bars are rotationally adjusted.

2. A handle for a bicycle according to claim 1, wherein said bar fitting portions at said bar holding member are provided at lower portions thereof with receiving portions which project inwardly from inner peripheries of said bar fitting portions to thereby receive said left-hand and right-hand handle bars fitted into said bar fitting portions respectively.

3. A handle for a bicycle according to claim 1, wherein said angle of each of said bar fitting portions slanted laterally is about 40° with respect to said center line of said handle stem, and said angle of each of said bar fitting portions slanted longitudinally backwardly of the bicycle is about 15° to 25° with respect to said center line.

4. A handle for a bicycle according to claim 1, wherein said bar fitting portions at said bar holding member, comprise bar fitting bores respectively, said bar fitting bores communicating with each other, said fixing means comprising a cone which is interposed into said communicating portion and which has a pair of slant faces for contacting said left-hand and right-hand handle bars fitted into said bar fitting bores respectively and a stepped through-bore vertically extending through said cone between said slant faces; and a tightening screw member disposed in said stepped through-bore and extending into a bore in said bar holding member for screwably tightening said cone toward said handle stem.

5. A handle for a bicycle according to claim 4 wherein at least one of said bar holding member and said cone further has holding means which temporarily restrains said cone from moving relative to said bar holding member in the direction of being tightened and holds said cone in the vicinity of openings of said bar fitting bores.

6. A handle for a bicycle according to claim 5, wherein said holding means has an elastically deformable stopper said stopprt being supported to one of said bar holding member and cone.

7. A handle for a bicycle according to claim 6, wherein one of said bar holding member and cone, has an engaging portion engageable with said stopper, so that said stopper supported to the other of said bar fitting member and cone, is engaged with said engaging portion, thereby holding said cone in a temporarily restraining fashion.

8. A handle for a bicycle according to claim 4, wherein said handle stem includes a draw-up cone and a draw-up bolt to draw up said draw-up cone relative to said stem for fixing said handle stem to a front fork at the bicycle, said tightening screw member comprising said draw-up bolt.

9. A handle for a bicycle according to claim 1, wherein said bar fitting portions at said bar holding member, comprise bar fitting bores respectively which communicate with each other, said bar holding member having a horizontal through-bore at the position corresponding to said communicating portion at said bar holding member, said fixing means being formed of a bolt and a nut, fitted into said through-bore.

10. A handle for a bicycle according to claim 1, wherein said handle has a positioning means by which said left-hand and right-hand handle bars fitted rotationally adjustably into said bar fitting portions at said bar holding member are set in position in the rotating direction of said handle bars respectively.

11. A handle for a bicycle according to claim 1, wherein said bar holding member has insertion bores through which control cables for operating actuators for the bicycle are inserted, so that said control cables passing within said left-hand and right-hand handle bars, are drawn out from said bar holding member.

* * * * *